US012000028B2

(12) United States Patent
Makino et al.

(10) Patent No.: US 12,000,028 B2
(45) Date of Patent: Jun. 4, 2024

(54) RAIL VEHICLE AXLE

(71) Applicant: NIPPON STEEL & SUMITOMO METAL CORPORATION, Tokyo (JP)

(72) Inventors: Taizo Makino, Kobe (JP); Takayuki Kamimura, Takarazuka (JP); Yuichiro Yamamoto, Amagasaki (JP); Yutaka Wakasu, Boalsburg, PA (US); Kiyonobu Sugae, Nishinomiya (JP); Yukiteru Takeshita, Nishinomiya (JP); Naomitsu Mizui, Amagasaki (JP)

(73) Assignee: NIPPON STEEL CORPORATION, Tokyo (JP)

( * ) Notice: Subject to any disclaimer, the term of this patent is extended or adjusted under 35 U.S.C. 154(b) by 218 days.

(21) Appl. No.: 15/751,020

(22) PCT Filed: Aug. 17, 2016

(86) PCT No.: PCT/JP2016/074038
§ 371 (c)(1),
(2) Date: Feb. 7, 2018

(87) PCT Pub. No.: WO2017/033818
PCT Pub. Date: Mar. 2, 2017

(65) Prior Publication Data
US 2018/0245189 A1 Aug. 30, 2018

(30) Foreign Application Priority Data
Aug. 24, 2015 (JP) .................................. 2015-165162

(51) Int. Cl.
*C22C 38/50* (2006.01)
*B61F 5/50* (2006.01)
(Continued)

(52) U.S. Cl.
CPC ................ *C22C 38/50* (2013.01); *B61F 5/50* (2013.01); *C21D 1/28* (2013.01); *C21D 6/002* (2013.01);
(Continued)

(58) Field of Classification Search
CPC .. F16C 3/02; F16C 3/023; F16C 3/026; F16C 3/03; F16C 3/035; F16C 2204/62; F16C 2326/10; B61F 99/00
See application file for complete search history.

(56) References Cited

U.S. PATENT DOCUMENTS 10,392,683 B2 * 8/2019 Makino .................... C22C 38/08
2003/0196735 A1 * 10/2003 Sugiura .................... C22C 38/02
148/602

(Continued)

FOREIGN PATENT DOCUMENTS

CN 101497968 A * 8/2009
CN 102978532 A * 3/2013 ............. B22D 11/16
(Continued)

OTHER PUBLICATIONS

Ware et al, Hollow axle developments by London Regional Transport and British Steel, 1985. Proc Instn Mech Engrs, vol. 199, No. D4 (Year: 1985).*
(Continued)

*Primary Examiner* — Adil A. Siddiqui
(74) *Attorney, Agent, or Firm* — Greer, Burns & Crain, Ltd.

(57) ABSTRACT

Provided is a rail vehicle axle having an excellent fatigue limit and notch factor. A rail vehicle axle according to the present embodiment has a chemical composition consisting of, in mass %, C: 0.20 to 0.35%, Si: 0.20 to 0.65%, Mn: 0.40 to 1.20%, P: 0.020% or less, S: 0.020% or less, Sn: 0.07 to 0.40%, N: 0.0200% or less, Cu: 0 to 0.30%, Ni: 0 to 0.30%,
(Continued)

Cr: 0 to 0.30%, Mo: 0 to 0.08%, Al: 0 to 0.100%, V: 0 to 0.060%, and Ti: 0 to 0.020%, with the balance being Fe and impurities, and satisfying Formulae (1) and (2):

$$0.58 \leq C+Si/8+Mn/5+Cu/10+Cr/4+V \leq 0.67 \quad (1)$$

$$Si+0.9Cr \geq 0.50 \quad (2)$$

where, each element symbol in Formulae (1) and (2) is substituted by the content (mass %) of a corresponding element.

4 Claims, 7 Drawing Sheets

(51) Int. Cl.
| | | |
|---|---|---|
| | *C21D 1/28* | (2006.01) |
| | *C21D 6/00* | (2006.01) |
| | *C21D 8/06* | (2006.01) |
| | *C21D 9/08* | (2006.01) |
| | *C21D 9/28* | (2006.01) |
| | *C22C 38/00* | (2006.01) |
| | *C22C 38/02* | (2006.01) |
| | *C22C 38/04* | (2006.01) |
| | *C22C 38/06* | (2006.01) |
| | *C22C 38/08* | (2006.01) |
| | *C22C 38/12* | (2006.01) |
| | *C22C 38/14* | (2006.01) |
| | *C22C 38/16* | (2006.01) |
| | *C22C 38/18* | (2006.01) |
| | *C22C 38/42* | (2006.01) |
| | *C22C 38/44* | (2006.01) |
| | *C22C 38/46* | (2006.01) |
| | *F16C 3/02* | (2006.01) |

(52) U.S. Cl.
CPC .............. *C21D 6/005* (2013.01); *C21D 6/008* (2013.01); *C21D 8/065* (2013.01); *C21D 9/08* (2013.01); *C21D 9/28* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/42* (2013.01); *C22C 38/44* (2013.01); *C22C 38/46* (2013.01); *F16C 3/02* (2013.01); *F16C 2204/62* (2013.01); *F16C 2326/10* (2013.01)

(56) References Cited

U.S. PATENT DOCUMENTS

| | | | | |
|---|---|---|---|---|
| 2006/0037677 | A1* | 2/2006 | Ono | C22C 38/02 |
| | | | | 148/603 |
| 2015/0044086 | A1* | 2/2015 | Miyanishi | C21D 8/06 |
| | | | | 420/83 |
| 2018/0245172 | A1* | 8/2018 | Yuya | C22C 38/44 |

FOREIGN PATENT DOCUMENTS

| | | | | | |
|---|---|---|---|---|---|
| JP | | 06033219 | A | 2/1994 | |
| JP | | 10008202 | A | 1/1998 | |
| JP | | 10008204 | A | 1/1998 | |
| JP | | 11279696 | A | 10/1999 | |
| JP | | 2000073140 | A | 3/2000 | |
| JP | | 2001206002 | A | 7/2001 | |
| WO | WO-2011102244 | A1 | * | 8/2011 | ............... C21D 8/02 |
| WO | WO-2013151009 | A1 | * | 10/2013 | ............... C21D 1/32 |
| WO | | 2015129258 | A1 | 3/2015 | |

OTHER PUBLICATIONS

Regazzi, Advances in Life Prediction and Durability of Railway Axles, 2013. Politecnico Di Milano, Department of Mechanical Engineering Doctoral Dissertation (Year: 2013).*
EN 13103:2001; Railway Applications Wheelsets and bogies—Non-powered axles—Design Method; pp. 20-23.
ISO 12107: 2003 (E); Metallic Materials—Fatigue testing—Statistical planning and analysis of data; p. 19.
Int'l. Search Report issued in Int'l. App. No. PCT/JP2016/074038, dated Nov. 22, 2016.
Ware D K et al: "Hollow Axle Developments by London Regional Transport and British Steel", Proceedings of the Institution of Mechanical Engineers, Part D: Journal of Automobile Engineering, vol. 199, No. 4, Oct. 1, 1985, pp. 265-274, XP001653456, ISSN: 0954-4070, DOI:10.1243/PIME_PROC_1985_199_166_01.
European Search Report of EP Application No. 16839165.4, dated Apr. 24, 2018.

* cited by examiner

RAIL VEHICLE AXLE

This is a National Phase Application filed under 35 U.S.C. § 371, of International Application No. PCT/JP2016/074038, filed Aug. 17, 2016, the contents of which are incorporated by reference.

TECHNICAL FIELD

The present invention relates to a rail vehicle axle.

BACKGROUND ART

A rail vehicle axle bears the weight of the vehicle. The rail vehicle axle is further subjected to a horizontal force caused by contact between the wheel and the rail every time the vehicle passes a curved rail (curve passing). In other words, the rail vehicle axle is repeatedly subjected to rotating bending stress for every one rotation of the wheel. And the amplitude of the bending stress increases at the time of curve passing.

Such a rail vehicle axle is required of a high fatigue limit. Particularly, an axle needs to be provided with a fitting part with a wheel, a gear, or a bearing because of its structural requirements. It is known that the fitting part is subjected to damages due to fretting fatigue. Moreover, in the non-fitting part, there is a risk of the occurrence of flaws and pits due to flying stones and corrosion in addition to damages due to ordinary fatigue, and decrease of fatigue limit resulting therefrom.

Japanese Patent Application Publication No. 06-33219 (Patent Literature 1), Japanese Patent Application Publication No. 10-8204 (Patent Literature 2), Japanese Patent Application Publication No. 10-8202 (Patent Literature 3), Japanese Patent Application Publication No. 11-279696 (Patent Literature 4), Japanese Patent Application Publication No. 2001-206002 (Patent Literature 5), and Japanese Patent Application Publication No. 2000-73140 (Patent Literature 6) propose a rail vehicle axle having an excellent fatigue limit.

Patent Literature 1 discloses as follows. The rail vehicle axle of this literature is subjected to ion nitriding treatment. As a result, a fitting part of the axle to be fitted into a wheel has a surface compound layer made up of $Fe_4N(\gamma)$ phase and having a thickness of 10 to 20 μm, and immediately below thereof, a diffusion layer having a maximum hardness of not less than 280 in Hv. Patent Literature 1 states that this results in an axle having a high fatigue limit.

Patent Literatures 2 and 3 disclose as follows. The rail vehicle axles disclosed in these literatures contain, in mass %, C: 0.3 to 0.48%, Si: 0.05 to 1%, Mn: 0.5 to 2%, Cr: 0.5 to 1.5%, Mo: 0.15 to 0.3%, and Ni: 0 to 2.4%. In a surface portion of this axle, onto which the wheel is fitted, there is an effective hardened layer, in which Vickers hardness is not less than 400, and which has a depth in a range of 1 to 4.5 mm, and in the inner part thereof, there is a martensite or bainite region. Patent Literatures 2 and 3 state that the above described rail vehicle axles have a high fatigue limit.

Patent Literature 4 discloses as follows. The rail vehicle axle disclosed in this literature contains, in mass %, C: 0.3 to 0.48%, Si: 0.05 to 1%, Mn: 0.5 to 2%, Cr: 0.5 to 1.5%, Mo: 0.15 to 0.3%, and Ni: 0 to 2.4%. The fitting part of this axle has a hardened layer having a Vickers hardness of not less than 400, and in the inner part thereof, a region of tempered martensite or bainite. In this axle, the depth of the hardened layer is not less than 5.0 mm, and not more than 10% of the diameter of the fitting part. Patent Literature 4 states that the above described rail vehicle axle has a high fretting fatigue limit.

Patent Literature 5 discloses as follows. The rail vehicle axle disclosed in this literature contains, in mass %, C: 0.3 to 0.48%, Si: 0.05 to 1.0%, Mn: 0.5 to 2.0%, Cr: 0.5 to 1.5%, Mo: 0.15 to 0.30%, and Ni: 0 to 2.4%. The above described axle has 0.2% proof stress of 700 to 1200 MPa. Further, surface portions of both the fitting part and the fillet part of the above described axle have a hardened layer formed by pressing or shotpeening. Literature 5 states that the above described rail vehicle axle has a high fretting fatigue limit.

Patent Literature 6 discloses as follows. The rail vehicle axle disclosed in this literature contains, in mass %, C: 0.3 to 0.48%, Si: 0.05 to 1%, Mn: 0.5 to 2%, Cr: 0 to 1.5%, Mo: 0 to 0.3%, and Ni: 0 to 2.4%. A fitting end part and a peripheral region thereof of the axle have a hardened layer having a Vickers hardness of not less than 400. The ratio (K/D) of the thickness (K) of the hardened layer to the diameter (D) of the fitting part is 0.005 to 0.05. The upper portion of the hardened layer contains 0.02 to 2% of B. Literature 6 states that the above described rail vehicle axle has an excellent fatigue limit.

CITATION LIST

Patent Literature

Patent Literature 1: Japanese Patent Application Publication No. 06-33219
Patent Literature 2: Japanese Patent Application Publication No. 10-8204
Patent Literature 3: Japanese Patent Application Publication No. 10-8202
Patent Literature 4: Japanese Patent Application Publication No. 11-279696
Patent Literature 5: Japanese Patent Application Publication No. 2001-206002
Patent Literature 6: Japanese Patent Application Publication No. 2000-73140

SUMMARY OF INVENTION

Technical Problem

In the rail vehicle axles disclosed in Patent Literatures 1 to 6, a hardened layer is formed by ion nitriding or induction quenching. This hardened layer improves fretting fatigue limit in the fitting part to be fitted into the wheel. As a result, the diameter of the fitting part can be made closer to the diameter of the non-fitting part.

Meanwhile, a rail vehicle axle may be subjected to normalizing without being subjected to induction quenching. A rail vehicle axle produced by performing normalizing has no hardened layer. For that reason, there is little effect of increasing the fretting fatigue limit of the fitting part. However, making the diameter of the fitting part larger than the diameter of the non-fitting part enables to avoid damages by fretting. However, even for such a rail vehicle axle, a high fatigue limit is required in the non-fitting part.

To increase the fatigue limit of the non-fitting part of the axle, it is preferable to be able to suppress the occurrence of a crack, and also suppress the propagation of the crack. A fatigue limit obtained through a rotating bending fatigue test using a smooth specimen is defined as a "smooth fatigue limit" $\sigma_p$. Further, a fatigue limit obtained through a rotating bending fatigue test using a notched specimen is defined as a "notched fatigue limit" $\sigma_n$. As the smooth fatigue limit $\sigma_p$ and the notched fatigue limit $\sigma_n$ increase, the fatigue limit of the non-fitting part of the axle increases.

Further, a factor defined by the following formula is defined as a "notch factor".

Notch factor=Smooth fatigue limit $\sigma_p$/Notched fatigue limit $\sigma_n$.

As the notch factor decreases, the decrease in fatigue limit due to a notch decreases. Thus, a smaller notch factor means higher safety against accidental events, which are assumed while an actual axle is used, such as flying stones, scratches, corrosion pits, or the like. For that reason, in European design standard EN13103: 2001 (Railway Applications Wheelsets and bogies—Non-powered axles—Design Method, p.p. 20 to 23), a required safety factor is determined based on the notch factor. Therefore, a rail vehicle axle is required of a high fatigue limit, and a low notch factor. The above described Patent Literatures 1 to 6 have studied fatigue limits. However, the notch factor, which is an index of safety, has not been studied.

It is an objective of the present invention to provide a rail vehicle axle having an excellent fatigue limit and notch factor.

Solution to Problem

A rail vehicle axle according to the present invention has a chemical composition consisting of, in mass %, C: 0.20 to 0.35%, Si: 0.20 to 0.65%, Mn: 0.40 to 1.20%, P: 0.020% or less, S: 0.020% or less, Sn: 0.07 to 0.40%, N: 0.0200% or less, Cu: 0 to 0.30%, Ni: 0 to 0.30%, Cr: 0 to 0.30%, Mo: 0 to 0.08%, Al: 0 to 0.100%, V: 0 to 0.060%, and Ti: 0 to 0.020%, with the balance being Fe and impurities, and satisfying Formulae (1) and (2):

$$0.58 \leq C+Si/8+Mn/5+Cu/10+Cr/4+V \leq 0.67 \quad (1)$$

$$Si+0.9Cr \geq 0.50 \quad (2)$$

where, each element symbol in Formulae (1) and (2) is substituted by the content (mass %) of a corresponding element.

Advantageous Effects of Invention

The rail vehicle axle according to the present embodiment has an excellent fatigue limit and notch factor.

DESCRIPTION OF EMBODIMENTS

Figure 1:
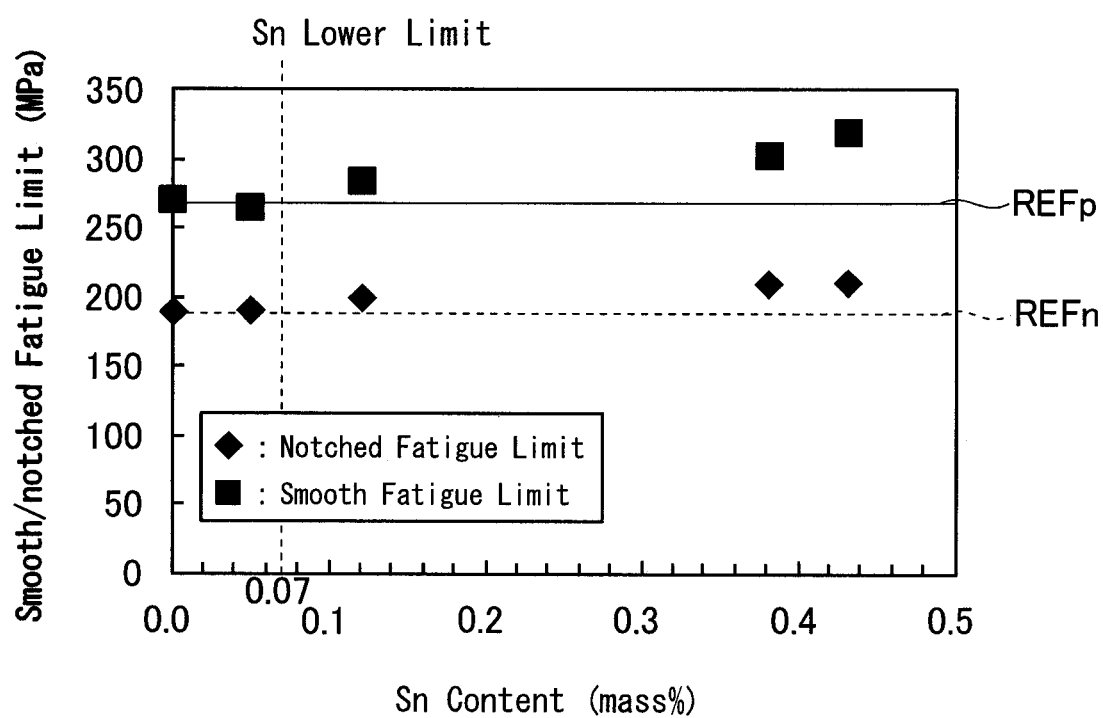
FIG. 1 is a diagram showing the relationship between the Sn content and each of the smooth fatigue limit and the notched fatigue limit in a rail vehicle axle which satisfies the chemical composition (containing only essential elements) excepting Sn of the present invention.

The present inventors have conducted investigation and study on the fatigue limit and notch factor of a rail vehicle axle. As a result, the present inventors have obtained the following findings.

(A) The fatigue limit (smooth fatigue limit $\sigma_p$ and notched fatigue limit $\sigma_n$) and the notch factor are affected by the tensile strength. The tensile strength is affected by C, Si, Mn, Cu, Cr, and V contents in steel.

It is defined as F1=C+Si/8+Mn/5+Cu/10+Cr/4+V. If F1 is less than 0.58, the tensile strength of a rail vehicle axle will be less than 590 MPa. In this occasion, a high fatigue limit (smooth fatigue limit $\sigma_p$ and notched fatigue limit $\sigma_n$) will not be achieved. On the other hand, if F1 is more than 0.67, the tensile strength TS will be more than 650 MPa. In this occasion, the notch factor will be too high. When F1 is 0.58 to 0.67, the tensile strength will be 590 to 650 MPa. Thus, an excellent fatigue limit and notch factor can be achieved.

(B) As the C content decreases, the smooth fatigue limit $\sigma_p$ increases. Conceivable reasons are as follows. As the C content increases, a volume ratio occupied by ferrite (hereinafter, referred to as a ferrite fraction) decreases in the microstructure of steel. When the ferrite fraction decreases, the difference between the hardness of the entire steel (average hardness) and the hardness of ferrite increases. In this occasion, a crack is more likely to occur in ferrite despite the average hardness. On the other hand, when the C content decreases, the ferrite fraction increases. In this occasion, the difference between the average hardness of the entire steel and the hardness of ferrite decreases. For that reason, a crack is less likely to occur in ferrite despite the average hardness. From what has been described so far, when the C content is low, the smooth fatigue limit $\sigma_p$ will increase.

If the C content is not more than 0.35%, the ferrite fraction will be sufficiently high, and if the tensile strength is not less than 590 MPa, the smooth fatigue limit $\sigma_p$ will reach not less than 250 MPa, and the smooth fatigue limit $\sigma_p$ further increases as a result of Sn being contained as described below.

(C) As described so far, as the notch factor decreases, the decrease of fatigue limit due to a notch decreases. That will result in improvement in the safety of the rail vehicle axle against an accidental event. However, the notched fatigue limit is dominated by whether or not a crack generated at a notch root will propagate. For that reason, when the ferrite fraction is too high, it is more likely that a crack propagates in the ferrite phase whose hardness is lower than that of the pearlite phase. Therefore, when the ferrite fraction is increased, although the smooth fatigue limit increases, the notched fatigue limit decreases. As a result, the notch factor, which is the ratio of the two, may increase. Accordingly, in the present embodiment, Cr and Si are contained so as to satisfy Formula (2):

$$Si+0.9Cr \geq 0.50 \quad (2)$$

where, each element symbol in Formula (2) is substituted by the content (mass %) of a corresponding element.

Cr and Si increase the strength of ferrite by solid-solution strengthening. Therefore, they suppress a crack from propagating in ferrite. It is defined as F2=Si+0.9Cr. F2 is an index of the strength of ferrite. When F2 is not less than 0.50, the strength of ferrite will sufficiently increase. As a result, even if the ferrite fraction increases, it is possible to avoid decrease of notched fatigue limit, thus suppressing the notch factor to be low. Specifically, the notch factor can be made not more than 1.47.

(D) Sn is additionally included in a rail vehicle axle which satisfied (A) to (C). In this case, the smooth fatigue limit and the notched fatigue limit will further increase. On the other hand, Sn increases to some extent the tensile strength, which is another mechanical property of the rail vehicle axle. However, the rate of increase of tensile strength by containing Sn is smaller than the rate of increase of fatigue limit. Therefore, Sn can further increase the smooth fatigue strength and the notched fatigue strength while maintaining or slightly increasing mechanical properties such as tensile strength.

Figure 2:
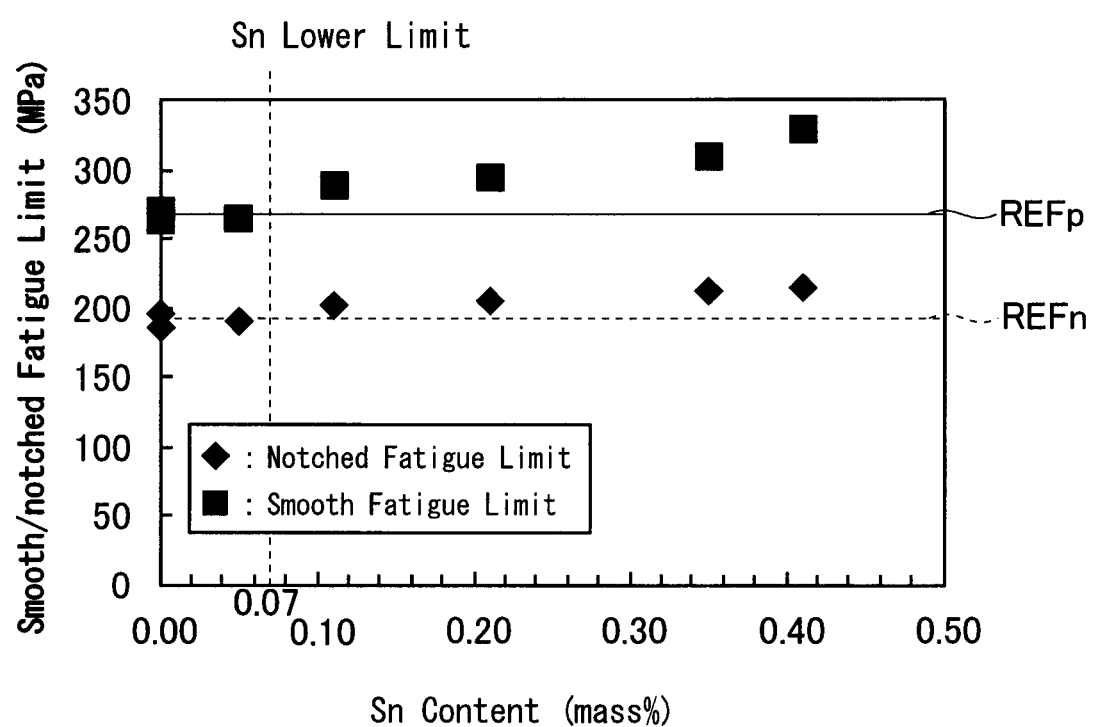
FIG. 2 is a diagram showing the relationship between the Sn content and each of the smooth fatigue limit and the notched fatigue limit in a rail vehicle axle which satisfies the chemical composition (containing essential elements and optional elements) excepting Sn of the present invention.
Figure 3:
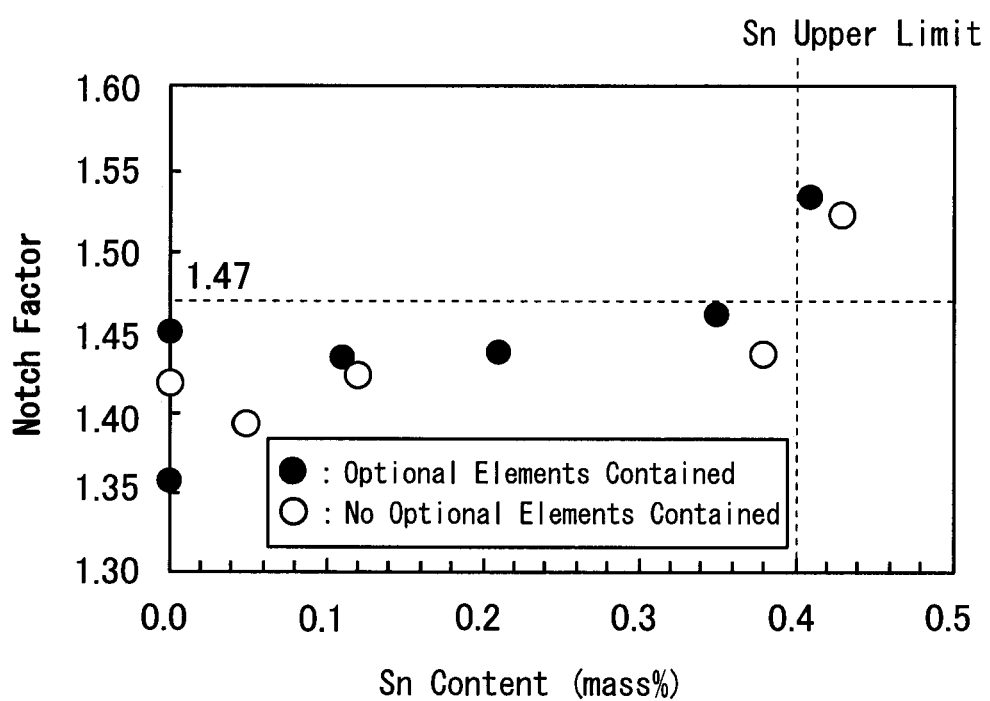
FIG. 3 is a diagram showing the relationship between the Sn content and the notch factor in a rail vehicle axle which satisfies the chemical composition excepting Sn of the present invention.

FIGS. 1 and 2 are each a diagram showing the relationship between the Sn content and each of the smooth fatigue limit and the notched fatigue limit in a rail vehicle axle which satisfies the chemical composition excepting Sn of the present invention, and also satisfies Formulae (1) and (2). FIG. 1 shows results when a rail vehicle axle containing only essential elements excepting Sn of the present invention is used. FIG. 2 shows results when a rail vehicle axle containing essential elements excepting Sn of the present invention and optional elements is used. FIG. 3 is a diagram showing the relationship between the Sn content and the notch factor in a rail vehicle axle which satisfies a chemical composition excepting Sn of the present invention, and also satisfies Formulae (1) and (2). FIGS. 1 to 3 were created based on the results obtained by Examples described below.

A reference symbol "♦" indicates a notched fatigue limit (MPa), and a reference symbol "■" indicates a smooth fatigue limit (MPa) in FIGS. 1 and 2. A reference line REFp shown by a solid line in FIGS. 1 and 2 indicates a smooth fatigue limit (MPa) of a rail vehicle axle containing no Sn. A reference line REFn shown by a broken line in FIGS. 1 and 2 indicates a notched fatigue limit (MPa) of a rail vehicle axle containing no Sn.

A reference symbol "○" in FIG. 3 indicates a notch factor of a rail vehicle axle which satisfies the chemical composition (containing only essential elements) excepting Sn of the present invention, and also satisfies Formulae (1) and (2). The reference symbol "●" indicates a notch factor of a rail vehicle axle which satisfies the chemical composition (containing essential elements and optional elements) excepting Sn of the present invention, and also satisfies Formulae (1) and (2).

With Reference to FIGS. 1 and 2, when the chemical composition excepting Sn of the rail vehicle axle is within the scope of the present invention and satisfies Formulae (1) and (2), if the Sn content is not less than 0.07%, the notched fatigue limit and the smooth fatigue limit will be higher than the notched fatigue limit REFn (MPa) and the smooth fatigue limit REFp (MPa) at a Sn content of 0%. Further, as the Sn content increases, the notched fatigue limit and the smooth fatigue limit increase.

On the other hand, with reference to FIG. 3, when the chemical composition excepting Sn of a rail vehicle axle is within the scope of the present invention and satisfies Formulae (1) and (2), if the Sn content is not more than 0.40%, the notch factor will be maintained to be not more than 1.47. However, when the Sn content is more than 0.40%, the notch factor will sharply increase, exceeding 1.47.

Therefore, if the Sn content is 0.07 to 0.40%, it is possible to obtain an excellent smooth fatigue limit and notched fatigue limit, and to maintain an excellent notch factor. Specifically, the smooth fatigue limit will be more than 270 MPa, and the notched fatigue limit will be more than 195 MPa.

The rail vehicle axle according to the present embodiment, which has been completed based on the above described findings, has a chemical composition consisting of, in mass %, C: 0.20 to 0.35%, Si: 0.20 to 0.65%, Mn: 0.40 to 1.20%, P: 0.020% or less, S: 0.020% or less, Sn: 0.07 to 0.40%, N: 0.0200% or less, Cu: 0 to 0.30%, Ni: 0 to 0.30%, Cr: 0 to 0.30%, Mo: 0 to 0.08%, Al: 0 to 0.100%, V: 0 to 0.060%, and Ti: 0 to 0.020%, with the balance being Fe and impurities, and satisfying Formulae (1) and (2):

$$0.58 \leq C+Si/8+Mn/5+Cu/10+Cr/4+V \leq 0.67 \quad (1)$$

$$Si+0.9Cr \geq 0.50 \quad (2)$$

where, each element symbol in Formulae (1) and (2) is substituted by the content (mass %) of a corresponding element.

The above described chemical composition may contain one or more kinds selected from the group consisting of Cu: 0.01 to 0.30%, Ni: 0.01 to 0.30%, Cr: more than 0.10 to 0.30%, and Mo: 0.005 to 0.08%. Moreover, the above described chemical composition may contain one or more kinds selected from the group consisting of Al: 0.005 to 0.100%, V: 0.005 to 0.060%, and Ti: 0.002 to 0.020%.

Hereinafter, the rail vehicle axle according to the present invention will be described in detail.

[Chemical Composition]

The chemical composition of the rail vehicle axle according to the present invention contains the following elements.

C: 0.20 to 0.35%

Carbon (C) increases the strength of steel. When the C content is too low, such effect will not be achieved. On the other hand, when the C content is too high, the ferrite fraction will decrease. When the ferrite fraction decreases, the smooth fatigue limit $\sigma_p$ decreases. Therefore, the C content is 0.20 to 0.35%. The lower limit of the C content is preferably 0.25%, and more preferably 0.30%. The upper limit of the C content is preferably 0.34%, and more preferably 0.33%.

Si: 0.20 to 0.65%

Silicon (Si) deoxidizes steel. Further, Si solid-solution strengthens ferrite. As a result, the notch factor decreases. When the Si content is too low, such effect will not be achieved. On the other hand, when the Si content is too high, toughness deteriorates. Therefore, the Si content is 0.20 to 0.65%. The lower limit of the Si content is preferably 0.25%, more preferably 0.30%, and further preferably 0.35%. The upper limit of the Si content is preferably 0.60%, more preferably 0.55%, further preferably 0.50%, and further preferably 0.48%.

Mn: 0.40 to 1.20%

Manganese (Mn) increases the strength of steel. When the Mn content is too low, such effect will not be achieved. On the other hand, when the Mn content is too high, the toughness of steel deteriorates. Therefore, the Mn content is 0.40 to 1.20%. The lower limit of the Mn content is preferably 0.50%, more preferably 0.60%, and further preferably 0.70%. The upper limit of the Mn content is preferably 1.15%, more preferably 1.10%, and further preferably 1.05%.

P: 0.020% or Less

Phosphorous (P) is an impurity. P segregates at grain boundaries, thereby decreasing the fatigue limit of steel. Therefore, the P content is 0.020% or less. The upper limit of the P content is preferably 0.018%, and more preferably 0.015%. The P content is preferably as low as possible.

S: 0.020% or Less

Sulfur (S) is an impurity. S combines with Mn to form sulfide, thereby decreasing the fatigue limit of steel. Therefore, the S content is 0.020% or less. The upper limit of the S content is preferably 0.015%, and more preferably 0.010%. The S content is preferably as low as possible.

Sn: 0.07 to 0.40%

Tin (Sn) dissolves into a ferrite phase to increase its strength, thereby increasing smooth fatigue limit and notched fatigue limit. When the Sn content is too low, such effect will not be achieved. On the other hand, when the Sn content is too high, the toughness will decrease. Further, when the Sn content is too high, the notch factor will become too high. Therefore, the Sn content is 0.07 to 0.40%. The lower limit of the Sn content is preferably 0.08%, and more preferably 0.09%. The upper limit of the Sn content is preferably 0.35%, and more preferably 0.30%.

N: 0.0200% or Less

Nitrogen (N) is inevitably contained. N forms fine nitrides (for example, AlN), thereby refining grains. However, when the N content is too high, coarse nitrides are formed, thereby decreasing the fatigue limit of steel. Therefore, the N content is 0.0200% or less. The upper limit of the N content is preferably 0.0150%, more preferably 0.0100%, and further preferably 0.0070%.

The balance of the chemical composition of a rail vehicle axle according to the present invention is Fe and impurities. Here, the impurities mean those which are mixed from ores and scraps as a raw material, or from production environments, etc. when the steel material is industrially produced, and which are tolerable within a range not adversely affecting the rail vehicle axle of the present invention.

The chemical composition of the rail vehicle axle according to the present invention may contain, in lieu of part of Fe, one or more kinds selected from the group consisting of Cu, Ni, Cr, and Mo. These elements are optional elements, and all of them increase the strength of steel.

Cu: 0 to 0.30%

Copper (Cu) is an optional element and may not be contained. When contained, Cu increases the strength of steel. However, when the Cu content is too high, the hot workability deteriorates. Therefore, the Cu content is 0 to 0.30%. The lower limit of the Cu content for more effectively achieving the above described effect is preferably 0.01%, and more preferably 0.02%. The upper limit of the Cu content is preferably 0.20%, more preferably 0.10%, and further preferably 0.05%.

Ni: 0 to 0.30%

Nickel (Ni) is an optional element and may not be contained. When contained, Ni increases the strength of steel. However, if the Ni content is too high, the above described effect will be saturated and besides, the cost will increase. Therefore, the Ni content is 0 to 0.30%. The lower limit of the Ni content for more effectively achieving the above described effect is preferably 0.01%, more preferably 0.02%, and further preferably 0.04%. The upper limit of the Ni content is preferably less than 0.20%, more preferably 0.15%, and further preferably 0.10%.

Cr: 0 to 0.30%

Chromium (Cr) is an optional element and may not be contained. When contained, Cr solid-solution strengthens ferrite. As a result, the notch factor decreases. However, when the Cr content is too high, the toughness of steel deteriorates. Therefore, the Cr content is 0 to 0.30%. The lower limit of the Cr content for more effectively achieving the above described effect is preferably more than 0.10%, more preferably 0.15%, and further preferably 0.20%. The upper limit of the Cr content is preferably less than 0.30%, more preferably 0.29%, and further preferably 0.28%.

Mo: 0 to 0.08%

Molybdenum (Mo) is an optional element and may not be contained. When contained, Mo increases the strength of steel. However, when the Mo content is too high, the form of laminar cementite in pearlite is disturbed, thereby decreasing the fatigue limit. Therefore, the Mo content is 0 to 0.08%. The lower limit of the Mo content for more effectively achieving the above described effect is preferably 0.005%, and more preferably 0.01%. The upper limit of the Mo content is preferably less than 0.08%, more preferably 0.06%, and further preferably 0.04%.

The chemical composition of the rail vehicle axle according to the present embodiment may contain, in lieu of part of Fe, one or more kinds selected from the group consisting of Al, V, and Ti. These elements are optional elements, and all of them refine grains.

Al: 0 to 0.100%

Aluminum (Al) is an optional element and may not be contained. When contained, Al deoxidizes steel. Further, Al combines with N to form AlN, thereby refining grains. As a result, the toughness of steel improves. However, when the Al content is too high, coarse oxide-base inclusions are formed, thereby decreasing the fatigue limit of steel. Therefore, the Al content is 0 to 0.100%. The lower limit of the Al content for more effectively achieving the above described effect is preferably 0.005%, more preferably 0.010%, and further preferably 0.015%. The upper limit of the Al content is preferably 0.080%, more preferably 0.060%, and further preferably 0.050%. The Al content herein refers to the content of acid-soluble Al (sol. Al).

V: 0 to 0.060%

Vanadium (V) is an optional element and may not be contained. When contained, V combines with N and C to form V(C, N), thereby refining grains and increasing the strength of steel. However, when the V content is too high, the toughness of steel deteriorates. Therefore, the V content is 0 to 0.060%. A lower limit of the V content for more effectively achieving the above described effect is preferably 0.005%. The upper limit of the V content is preferably 0.030%, more preferably 0.020%, and further preferably 0.010%.

Ti: 0 to 0.020%

Titanium (Ti) is an optional element and may not be contained. When contained, Ti combines with N to form fine TiN, and thereby precipitation-strengthens ferrite. Further, TiN refines grains. As a result, Ti increases the smooth fatigue limit and the notched fatigue limit. Further, an excellent notch factor is obtained. Note that fine TiN is less likely to act as a site of crack generation. However, when the Ti content is too high, TiN is generated in an excessive amount. In this case, TiN acts as a passage of a crack, thereby facilitating propagation of the crack. Therefore, the notch factor increases. Therefore, the Ti content is 0 to 0.020%. The lower limit of the Ti content for more effectively achieving the above described effect is preferably 0.002%, and more preferably 0.003%. The upper limit of the Ti content is preferably 0.015%, more preferably 0.010%, and further preferably 0.007%. When the Ti content is not more than 0.007%, the notch factor will remarkably decrease.

[Formula (1)]

The chemical composition of the rail vehicle axle of the present invention further satisfies Formula (1):

$$0.58 \leq C + Si/8 + Mn/5 + Cu/10 + Cr/4 + V \leq 0.67 \quad (1)$$

where, each element symbol in Formula (1) is substituted by the content (mass %) of a corresponding element.

It is defined as $F1 = C + Si/8 + Mn/5 + Cu/10 + Cr/4 + V$. When F1 is too low, the tensile strength TS of the rail vehicle axle will be less than 590 MPa. In this occasion, the fatigue limit decreases. Specifically, the smooth fatigue limit $\sigma_p$ and/or the notched fatigue limit $\sigma_n$ decrease.

On the other hand, when F1 is too high, the tensile strength TS will be more than 650 MPa. When the tensile strength TS increases, the smooth fatigue limit $\sigma_p$ and the notched fatigue limit $\sigma_n$ also increase. However, the degree of increase in the notched fatigue limit $\sigma_n$ in association with increase in the tensile strength TS is smaller than the degree of increase in the smooth fatigue limit $\sigma_p$. Therefore, when the tensile strength TS reaches more than 650 MPa, the notch factor becomes too high.

When F1 is 0.58 to 0.67, the tensile strength TS of the rail vehicle axle will be 590 MPa to 650 MPa, that is, in a proper range. As a result, the fatigue limit and the notch factor will have appropriate values.

The lower limit of F1 is preferably more than 0.58, more preferably 0.60, further preferably 0.61, and further preferably 0.62. The upper limit of F1 is preferably less than 0.67, more preferably 0.66, and further preferably 0.65.

[Formula (2)]

The chemical composition of the rail vehicle axle of the present invention further satisfies Formula (2):

$$Si + 0.9Cr \geq 0.50 \quad (2)$$

where, each element symbol in Formula (2) is substituted by the content (mass %) of a corresponding element.

As described so far, Si and Cr increase the strength of ferrite in steel. Thereby, Si and Cr suppress the propagation of a crack. As a result, the notch factor decreases. Note that Si and Cr are not likely to affect the ferrite fraction in steel.

It is defined as $F2 = Si + 0.9Cr$. When F2 is too low, the notch factor will become too high, making it easier for a crack to propagate. When F2 is not less than 0.50, the notch factor will reach not more than 1.47 so that decrease of fatigue limit due to a notch is suppressed.

The lower limit of F2 is preferably more than 0.50, more preferably 0.55, and further preferably 0.60.

[Production Method]

An example of the production method of a rail vehicle axle according to the present embodiment will be described.

A molten steel having the above described chemical composition is produced. An ingot is produced by using the molten steel. The ingot is subjected to hot forging, to produce a crude product having an axle shape. The produced crude product is subjected to normalizing. Specifically, the crude product is held at a heat treatment temperature higher than the $A_{c1}$ transformation point, and is allowed to cool. After the normalizing, tempering may be performed at a heat treatment temperature lower than $A_{c1}$ point.

After the above described heat treatment is performed, the crude product is subjected to machining to produce a rail vehicle axle.

Examples

Rail vehicle axles having various chemical compositions were produced, and the tensile strength and the fatigue limit thereof were investigated.

[Test Method]

Molten steels having chemical compositions shown in Table 1 were produced.

TABLE 1

| Test No. | Chemical composition (in the unit of mass %, the balance being Fe and impurities) | | | | | | | | | | | | | | | | |
|---|---|---|---|---|---|---|---|---|---|---|---|---|---|---|---|---|---|
| | C | Si | Mn | P | S | Sn | N | Cu | Ni | Cr | Mo | Al | V | Ti | F1 | F2 |
| 1 | 0.30 | 0.40 | 0.94 | 0.012 | 0.006 | 0.11 | 0.0027 | 0.02 | 0.05 | 0.26 | 0.01 | 0.032 | — | 0.007 | 0.61 | 0.63 |
| 2 | 0.30 | 0.39 | 0.94 | 0.015 | 0.004 | — | 0.0041 | 0.09 | 0.05 | 0.27 | 0.02 | 0.034 | — | 0.008 | 0.61 | 0.63 |
| 3 | 0.30 | 0.39 | 0.96 | 0.010 | 0.005 | — | 0.0030 | 0.03 | 0.05 | 0.27 | 0.02 | 0.036 | — | 0.006 | 0.61 | 0.63 |
| 4 | 0.30 | 0.61 | 1.16 | 0.010 | 0.006 | — | 0.0023 | — | — | — | — | — | — | — | 0.61 | 0.61 |
| 5 | 0.34 | 0.28 | 1.04 | 0.002 | 0.002 | — | 0.0031 | 0.01 | 0.06 | 0.15 | 0.01 | 0.031 | — | — | 0.62 | 0.42 |
| 6 | 0.28 | 0.35 | 0.90 | 0.011 | 0.005 | — | 0.0015 | 0.02 | 0.04 | 0.25 | 0.01 | 0.034 | — | — | 0.57 | 0.58 |
| 7 | 0.34 | 0.40 | 1.12 | 0.010 | 0.004 | — | 0.0025 | 0.01 | 0.05 | 0.25 | 0.02 | 0.031 | — | — | 0.68 | 0.63 |
| 8 | 0.30 | 0.40 | 0.94 | 0.012 | 0.007 | 0.05 | 0.0042 | 0.02 | 0.05 | 0.25 | 0.01 | 0.032 | — | 0.007 | 0.60 | 0.63 |
| 9 | 0.31 | 0.40 | 0.94 | 0.013 | 0.007 | 0.21 | 0.0038 | 0.02 | 0.05 | 0.25 | 0.01 | 0.032 | — | 0.007 | 0.61 | 0.63 |
| 10 | 0.30 | 0.41 | 0.95 | 0.011 | 0.006 | 0.35 | 0.0033 | 0.02 | 0.05 | 0.25 | 0.01 | 0.035 | — | 0.007 | 0.61 | 0.64 |
| 11 | 0.29 | 0.42 | 0.95 | 0.013 | 0.008 | 0.41 | 0.0038 | 0.02 | 0.05 | 0.26 | 0.01 | 0.035 | — | 0.009 | 0.60 | 0.65 |
| 12 | 0.32 | 0.59 | 1.05 | 0.010 | 0.005 | 0.05 | 0.0035 | — | — | — | — | — | — | — | 0.60 | 0.59 |
| 13 | 0.31 | 0.60 | 1.07 | 0.010 | 0.004 | 0.12 | 0.0033 | — | — | — | — | — | — | — | 0.60 | 0.60 |
| 14 | 0.31 | 0.59 | 1.05 | 0.010 | 0.005 | 0.38 | 0.0040 | — | — | — | — | — | — | — | 0.59 | 0.59 |
| 15 | 0.30 | 0.42 | 0.80 | 0.011 | 0.007 | 0.10 | 0.0038 | 0.01 | 0.04 | 0.24 | 0.01 | 0.038 | 0.05 | 0.006 | 0.62 | 0.64 |
| 16 | 0.32 | 0.53 | 1.05 | 0.010 | 0.005 | 0.43 | 0.0035 | — | — | — | — | — | — | — | 0.60 | 0.53 |
| 17 | 0.30 | 0.53 | 0.99 | 0.010 | 0.005 | 0.10 | 0.0035 | — | — | — | — | — | — | — | 0.56 | 0.53 |
| 18 | 0.32 | 0.41 | 1.12 | 0.010 | 0.004 | 0.12 | 0.0033 | — | — | — | — | — | — | — | 0.60 | 0.41 |
| 19 | 0.35 | 0.42 | 1.08 | 0.013 | 0.006 | 0.10 | 0.0036 | 0.02 | 0.05 | 0.23 | 0.02 | 0.033 | — | — | 0.68 | 0.63 |
| 20 | 0.31 | 0.41 | 1.02 | 0.010 | 0.005 | 0.12 | 0.0039 | 0.02 | 0.05 | 0.23 | 0.02 | — | — | — | 0.62 | 0.62 |
| 21 | 0.33 | 0.56 | 0.98 | 0.011 | 0.006 | 0.10 | 0.0029 | — | — | — | — | 0.032 | 0.007 | — | 0.60 | 0.56 |
| 22 | 0.28 | 0.36 | 0.88 | 0.009 | 0.004 | 0.10 | 0.0023 | 0.01 | 0.04 | 0.24 | 0.01 | 0.034 | — | — | 0.56 | 0.58 |
| 23 | 0.33 | 0.26 | 1.10 | 0.018 | 0.004 | 0.12 | 0.0038 | 0.02 | 0.05 | 0.16 | 0.01 | 0.033 | — | — | 0.62 | 0.40 |

F1 values in the chemical compositions of corresponding test numbers are listed in the "F1" column in Table 1. F2 values in the chemical compositions of corresponding test numbers are listed in the "F2" column.

[Production of Rail Vehicle Axle]

Figure 4:
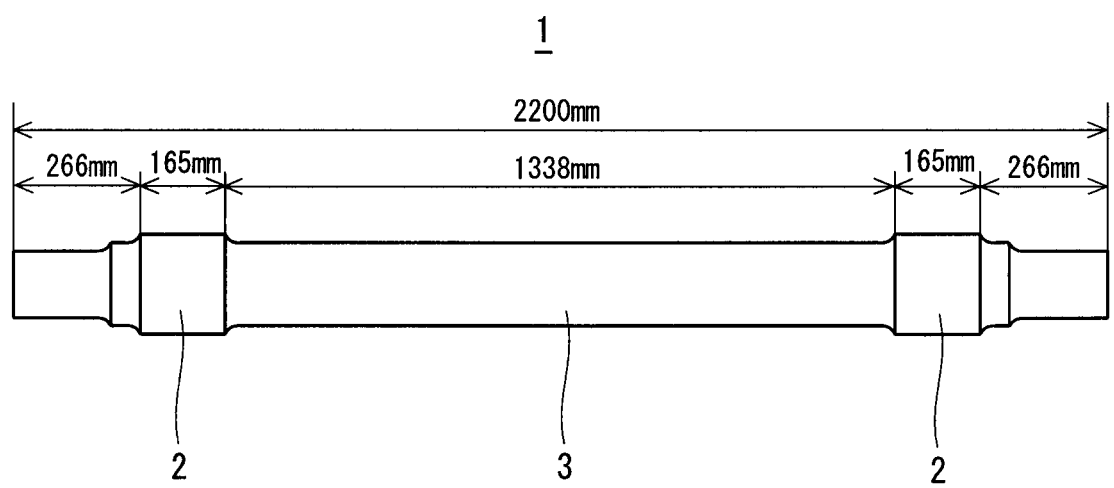
FIG. 4 is a side view of a crude product having an axle shape, which is produced in an example.

Ingots were produced from the molten steels of Test Nos. 1 to 23. After being heated at 1250° C., the ingots were subjected to hot forging to produce a crude product 1 having an axle shape shown in FIG. 4. The crude product 1 had a length of 2200 mm. The crude product 1 had two wheel seats 2 and an axle body 3. Each wheel seat 2 had a width of 165 mm and a diameter of 200 mm. As shown in FIG. 4, the distance between an end of each wheel seat 2 and an end of the crude product 1 was 266 mm, and the distance from an end of one wheel seat 2 to an end of the other wheel seat 2 was 1338 mm. The axle body 3 was disposed between the two wheel seats 2, and had a diameter of 174 mm.

The crude product of each test number was subjected to normalizing. The heat treatment temperature for the normalizing was 880° C. which is higher than the $Ac_1$ transformation point of steel of each test number. After normalizing, each crude product was subjected to machining to produce a rail vehicle axle which had a wheel seat having a diameter of 194 mm, and an axle body having a diameter of 168 mm. The following fatigue test specimens were taken from the rail vehicle axle of each test number.

[Preparation of Smooth Specimen]

Figure 5:
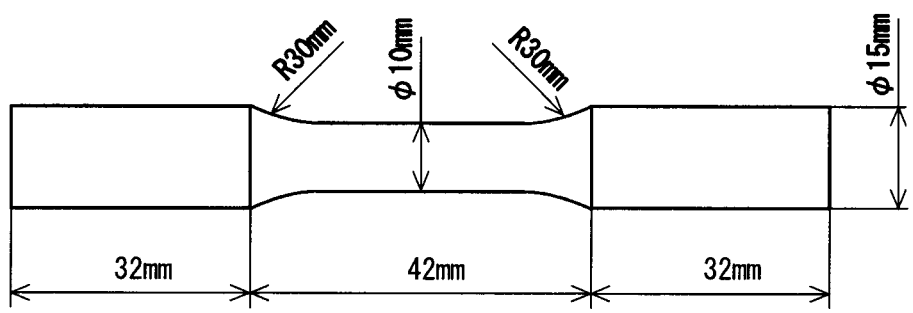
FIG. 5 is a side view of a smooth specimen used in an example.
Figure 6:
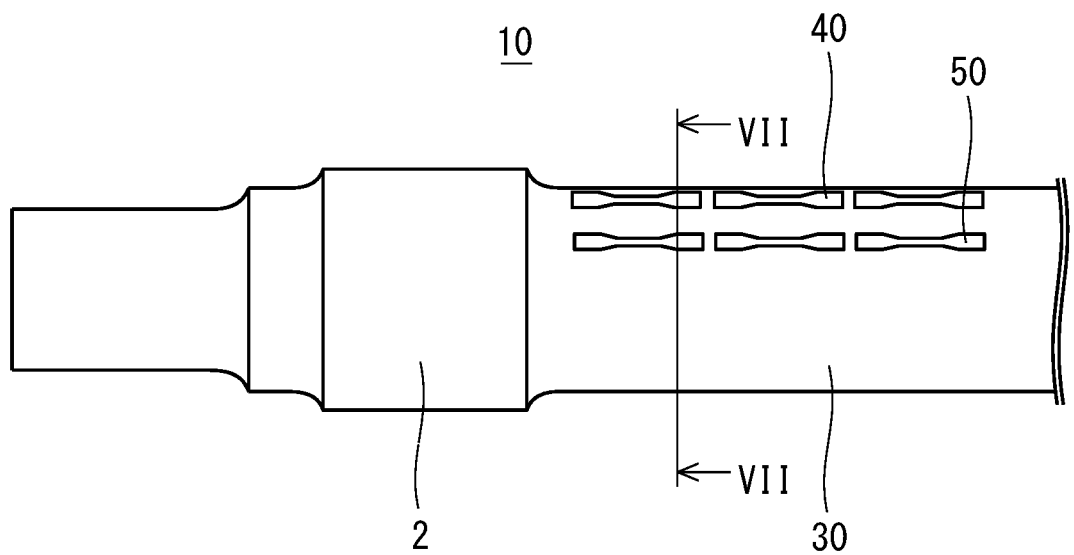
FIG. 6 is a diagram to illustrate positions where smooth specimens and tensile specimens are taken in a rail vehicle axle in an example.
Figure 7:
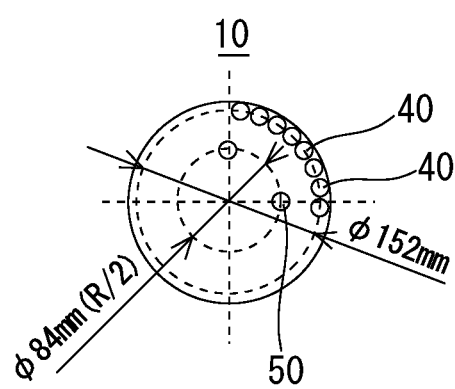
FIG. 7 is a cross sectional view along a VII-VII line in FIG. 6.

A smooth specimen having a shape shown in FIG. 5 was sampled from a rail vehicle axle of each test number. As shown in FIGS. 6 and 7, the smooth specimen 40 was taken from the vicinity (where the center axis of the smooth specimen corresponds to a position at a depth of 8 mm from the surface of the rail vehicle axle 10) of the surface of the axle body 30 of the rail vehicle axle 10 in such a way that the longitudinal direction of the smooth specimen 40 coincides with the longitudinal direction of the rail vehicle axle 10. Referring back to FIG. 5, the transverse shape (section normal to the axis) of the smooth specimen was a circle. The diameter of the evaluation part of the smooth specimen was 10 mm, and the diameter of the grip part was 15 mm. Other dimensions were as shown in FIG. 5.

[Preparation of Notched Specimen]

Figure 8:
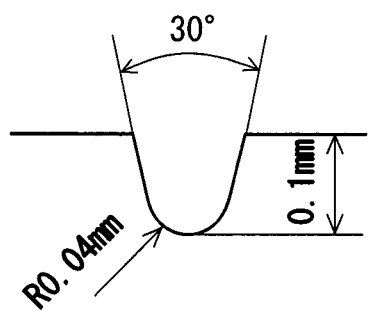
FIG. 8 is a sectional view of a circumferential notched portion of a notched specimen used in an example.

A notched specimen was sampled from a rail vehicle axle of each test number. The location and direction in which the specimen was taken were the same as those of the above described smooth specimen. Further, the general shape of the notched specimen was the same as that of the smooth specimen of FIG. 5. Moreover, in the notched specimen, a circumferential notch having a depth of 0.1 mm and a notch-root radius of curvature of 0.04 mm as shown in FIG. 8 was formed in the middle of the evaluation part.

[Rotating Bending Fatigue Limit Test]

Ono-type rotating bending fatigue test was performed on the smooth specimen and the notched specimen of each test number. The number of tests in the Ono-type rotating bending fatigue test was 6 for each of the smooth specimen and the notched specimen for each test number. With a revolution rate of 3600 rpm, the test was conducted at normal temperature (25° C.) in the atmosphere. When no breakage occurred until a number of cycles of $1.0 \times 10^7$, the test was discontinued and judged as non-breakage. The determination of fatigue limit was made based on the modified staircase method according to ISO12107: 2003(E) (Metallic materials-Fatigue testing-Statistical planning and analysis of data, p. 19). The difference between stress levels in this method was 10 MPa, and test results, which were obtained by decreasing the stress level by the difference when breakage occurred, and by increasing the stress level by the difference when no breakage occurred, were subjected to statistical processing to determine a fatigue limit corresponding to a 50% failure probability. The smooth fatigue limit $\sigma_p$ and the notched fatigue limit $\sigma_n$ (in the unit of MPa) were each defined as thus obtained fatigue limit. It is noted that the notched fatigue limit $\sigma_n$ was estimated by a nominal stress which was determined by dividing a bending moment by a section modulus of the cross section (circular shape with a diameter of 9.8 mm) at the root of a notch.

[Tensile Test]

A bar-shaped tensile specimen was sampled by machining from a rail vehicle axle of each test number. As shown in FIG. 7, the tensile specimen 50 was taken at an R/2 position (position of a diameter of 84 mm to bisect the interval between the central axis and the outer peripheral surface of the axle in a cross section of the axle) of the axle body 30 of the rail vehicle axle 10. The longitudinal direction of the tensile specimen was parallel with the longitudinal direction of the axle. By using the tensile specimen, a tensile test was conducted at ordinary temperature (25° C.) in the atmosphere to determine tensile strength TS (MPa).

[Test Results]

Table 2 shows test results.

TABLE 2

| Test No. | TS (MPa) | $\sigma_p$ (MPa) | $\sigma_n$ (MPa) | $\sigma_p/\sigma_n$ |
|---|---|---|---|---|
| 1 | 612 | 290 | 202 | 1.436 |
| 2 | 610 | 270 | 186 | 1.452 |
| 3 | 612 | 265 | 195 | 1.359 |
| 4 | 613 | 270 | 190 | 1.420 |
| 5 | 621 | 265 | 165 | 1.606 |
| 6 | 576 | 245 | 170 | 1.441 |
| 7 | 660 | 265 | 180 | 1.472 |
| 8 | 618 | 265 | 190 | 1.395 |
| 9 | 638 | 295 | 205 | 1.439 |
| 10 | 643 | 310 | 212 | 1.462 |
| 11 | 644 | 330 | 215 | 1.535 |
| 12 | 608 | 265 | 190 | 1.395 |
| 13 | 610 | 280 | 200 | 1.400 |
| 14 | 641 | 302 | 210 | 1.438 |
| 15 | 618 | 290 | 200 | 1.450 |
| 16 | 640 | 320 | 210 | 1.524 |
| 17 | 570 | 235 | 170 | 1.382 |
| 18 | 610 | 295 | 200 | 1.475 |
| 19 | 667 | 300 | 200 | 1.500 |
| 20 | 608 | 285 | 203 | 1.404 |
| 21 | 614 | 290 | 198 | 1.465 |
| 22 | 568 | 250 | 175 | 1.429 |
| 23 | 605 | 295 | 198 | 1.490 |

In Table 2, tensile strength (MPa) of each test number is listed in the "TS" column; smooth fatigue limit (MPa) in the "$\sigma_p$" column, notched fatigue limit (MPa) in the "$\sigma_n$" column, and notch factor in the "$\sigma_p/\sigma_n$" column.

With Reference to Tables 1 and 2, the chemical compositions of Test Nos. 1, 9, 10, 13 to 15, 20 and 21 were appropriate and contain an appropriate amount of Sn, and F1 satisfied Formula (1) and F2 satisfied Formula (2). As a result, the tensile strengths were 590 to 650 MPa. Further, the smooth fatigue limits $\sigma_p$ were more than 270 MPa, and the notched fatigue limits $\sigma_n$ were more than 195 MPa. Furthermore, the notch factors $\sigma_p/\sigma_n$ were not more than 1.47.

On the other hand, in the chemical compositions of Test Nos. 2 to 4, although F1 and F2 satisfied Formulae (1) and (2), Sn was not contained. As a result, although the tensile strengths were 590 to 650 MPa and the notch factors $\sigma_p/\sigma_n$ were not more than 1.47, the smooth fatigue limits $\sigma_p$ and the notched fatigue limits $\sigma_n$ were lower than those of Test No. 1. Specifically, although the smooth fatigue limits $\sigma_p$ were not less than 250 MPa, they were not more than 270 MPa. Moreover, although the notched fatigue limits $\sigma_n$ were not less than 170 MPa, they were not more than 195 MPa.

The chemical composition of Test No. 5 contained no Sn, and F2 did not satisfy Formula (2). As a result, the notched fatigue limit was less than 170 MPa, being much lower than those of Test Nos. 2 to 4, and the notch factor $\sigma_p/\sigma_n$ was more than 1.47.

The chemical composition of Test No. 6 contained no Sn, and F1 was less than the lower limit of Formula (1). As a result, the tensile strength was less than 590 MPa, being lower than those of Test Nos. 1 to 4. Further, the smooth fatigue limit $\sigma_p$ was not more than 270 MPa.

The chemical composition of Test No. 7 contained no Sn, and F1 was more than the upper limit of Formula (1). As a result, the tensile strength was more than 650 MPa, the notch factor $\sigma_p/\sigma_n$ was more than 1.47.

In Test Nos. 8 and 12, the Sn content was too low. As a result, the smooth fatigue limits $\sigma_p$ and the notched fatigue limits $\sigma_n$ were too low. Specifically, the smooth fatigue limits $\sigma_p$ were not more than 270 MPa, and the notched fatigue limits $\sigma_n$ were not more than 190 MPa.

In Test Nos. 11 and 16, the Sn content was too high. As a result, the notch factors $\sigma_p/\sigma_n$ were more than 1.47.

In Test Nos. 17 and 22, F1 was less than the lower limit of Formula (1). As a result, the tensile strengths were less than 590 MPa. Further, the smooth fatigue limits $\sigma_p$ and the notched fatigue limits $\sigma_n$ were too low. The smooth fatigue limits $\sigma_p$ were not more than 270 MPa, and the notched fatigue limits an were not more than 190 MPa.

In Test Nos. 18 and 23, F2 was less than the lower limit of Formula (2). As a result, although the smooth fatigue limits $\sigma_p$ and the notched fatigue limits an were appropriate, the notch factors $\sigma_p/\sigma_n$ were more than 1.47.

In Test No. 19, F1 was more than the upper limit of Formula (1). As a result, the tensile strength was more than 650 MPa, and the notch factor $\sigma_p/\sigma_n$ was more than 1.47.

So far, embodiments of the present invention have been described. However, the above described embodiments are merely illustrations for practicing the present invention. Therefore, the present invention will not be limited to the above described embodiments, and can be practiced by appropriately modifying the above described embodiments within a range not departing from the spirit thereof.

The invention claimed is:

1. A rail vehicle axle comprising:
a chemical composition consisting of, in mass %,
C: 0.20 to 0.35%,
Si: 0.20 to 0.65%,
Mn: 0.40 to 1.20%,
P: 0.020% or less,
S: 0.020% or less,
Sn: 0.21 to 0.40%,
N: 0.0200% or less,
Cu: 0 to 0.30%,
Ni: 0 to 0.30%,
Al: 0 to 0.100%,
V: 0 to 0.060%, and
one or more from the group consisting of Cr: more than 0.20 to 0.30%, Mo: 0.005 to 0.08%, and Ti: 0.002 to 0.020%, with the balance being Fe and impurities, and satisfying Formulae (1) and (2):

$$0.58 \leq C+Si/8+Mn/5+Cu/10+Cr/4+V \leq 0.67 \quad (1)$$

$$Si+0.9Cr \geq 0.60 \quad (2)$$

where each element symbol in Formulae (1) and (2) is substituted by the content (mass %) of a corresponding element,
wherein the smooth fatigue limit is more than 270 MPa, the notched fatigue limit is more than 195 MPa, and
a notch factor of the rail vehicle axle is not more than 1.47, where notch factor is defined by smooth fatigue limit divided by notched fatigue limit.

2. The rail vehicle axle according to claim 1, wherein the chemical composition contains one or more selected from the group consisting of:
Cu: 0.01 to 0.30%, and
Ni: 0.01 to 0.30%.

3. The rail vehicle axle according to claim 1, wherein the chemical composition contains one or more selected from the group consisting of:
Al: 0.005 to 0.100%, and
V: 0.005 to 0.060%.

4. The rail vehicle axle according to claim 2, wherein the chemical composition contains one or more selected from the group consisting of:
Al: 0.005 to 0.100%, and
V: 0.005 to 0.060%.

* * * * *